(12) United States Patent
Shelest et al.

(10) Patent No.: US 7,707,619 B2
(45) Date of Patent: Apr. 27, 2010

(54) METHOD AND SYSTEM FOR TROUBLESHOOTING WHEN A PROGRAM IS ADVERSELY IMPACTED BY A SECURITY POLICY

(75) Inventors: Art Shelest, Sammamish, WA (US); Pradeep Bahl, Redmond, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/045,733

(22) Filed: Jan. 28, 2005

(65) Prior Publication Data

US 2006/0174318 A1 Aug. 3, 2006

(51) Int. Cl.
*H04L 29/00* (2006.01)
(52) U.S. Cl. .......................................................... 726/1
(58) Field of Classification Search .................... 726/1, 726/11, 13, 22, 25
See application file for complete search history.

(56) References Cited

U.S. PATENT DOCUMENTS

| | | | |
|---|---|---|---|
| 3,676,000 A | 7/1972 | Mayer, Jr. et al. | |
| 5,195,133 A | 3/1993 | Kapp | |
| 5,950,195 A | 9/1999 | Stockwell et al. | |
| 5,987,611 A * | 11/1999 | Freund | 726/4 |
| 6,157,931 A | 12/2000 | Cane | |
| 6,412,070 B1 | 6/2002 | Van Dyke et al. | |
| 6,631,200 B1 | 10/2003 | Savoray et al. | |
| 6,678,827 B1 | 1/2004 | Rothermel et al. | |
| 6,986,051 B2 | 1/2006 | Le Pennec et al. | |
| 7,032,244 B2 | 4/2006 | Wilkes | |
| 7,039,948 B2 | 5/2006 | Harrah et al. | |
| 7,085,928 B1 | 8/2006 | Schmid et al. | |
| 7,152,242 B2 | 12/2006 | Douglas | |
| 7,213,146 B2 * | 5/2007 | Stehlin | 713/166 |
| 7,328,451 B2 * | 2/2008 | Aaron | 726/13 |
| 7,373,659 B1 | 5/2008 | Vignoles et al. | |
| 7,380,267 B2 | 5/2008 | Arai et al. | |
| 7,549,158 B2 | 6/2009 | Shelest et al. | |
| 7,591,002 B2 | 9/2009 | Shelest et al. | |
| 7,591,010 B2 | 9/2009 | Shelest et al. | |
| 2003/0110397 A1 | 6/2003 | Supramaniam et al. | |
| 2003/0135759 A1 | 7/2003 | Kim et al. | |
| 2004/0093506 A1 * | 5/2004 | Grawrock et al. | 713/189 |
| 2004/0181690 A1 | 9/2004 | Rothermel et al. | |
| 2004/0220947 A1 | 11/2004 | Aman et al. | |
| 2004/0225877 A1 | 11/2004 | Huang | |

(Continued)

OTHER PUBLICATIONS

U.S. Appl. No. 11/150,819, filed Jun. 9, 2005, Shelest et al.

(Continued)

*Primary Examiner*—Ellen Tran
(74) *Attorney, Agent, or Firm*—Perkins Coie LLP

(57) ABSTRACT

A method and system for selectively excluding a program from a security policy is provided. The security system receives from a user an indication of a program with a problem that is to be excluded from the security policy. When the program executes and a security enforcement event occurs, the security system does not apply the security policy. If the problem appears to be resolved as a result of excluding the program from the security policy, then the user may assume that the security policy is the cause of the problem.

8 Claims, 6 Drawing Sheets

U.S. PATENT DOCUMENTS

| | | |
|---|---|---|
| 2005/0022018 A1 | 1/2005 | Szor |
| 2005/0240990 A1 | 10/2005 | Trutner et al. |
| 2005/0273856 A1 | 12/2005 | Huddleston |
| 2006/0005227 A1 | 1/2006 | Samuelsson et al. |
| 2006/0048209 A1 | 3/2006 | Shelest |
| 2006/0161965 A1 | 7/2006 | Shelest |
| 2006/0282876 A1 | 12/2006 | Shelest et al. |

OTHER PUBLICATIONS

Moore, B. et al., "Policy Core Information Model—Version 1 Specification (RFC 3060)," Feb. 2001, Network Working Group, Version 1.

Liu et al., "An agent based architecture for supporting application level security," DARPA Information Survivability Conference and Exposition, 2000, DISCEX'00 Proceedings, vol. 1, Jan. 25-27, 2000, pp. 187-198 vol. 1.

\* cited by examiner

METHOD AND SYSTEM FOR TROUBLESHOOTING WHEN A PROGRAM IS ADVERSELY IMPACTED BY A SECURITY POLICY

TECHNICAL FIELD

The described technology relates generally to troubleshooting an adverse impact of a security policy.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of software systems including application programs or other computer programs executing on those computer systems. Developers of software systems and administrators of computer systems of an enterprise go to great effort and expense to identify and remove vulnerabilities. Because of the complexity of software systems, however, it is virtually impossible to identify and remove all vulnerabilities before software systems are released. After a software system is released, developers can become aware of vulnerabilities in various ways. A party with no malicious intent may identify a vulnerability and may secretly notify the developer so the vulnerability can be removed before a hacker identifies and exploits it. If a hacker identifies a vulnerability first, the developer may not learn of the vulnerability until it is exploited—sometimes with disastrous consequences.

Regardless of how a developer finds out about a vulnerability, the developer typically develops and distributes to system administrators "patches" or updates to the software system that remove the vulnerability. If the vulnerability has not yet been exploited (e.g., might not be known to hackers), then a developer can design, implement, test, and distribute a patch in a disciplined way. If the vulnerability has already been widely exposed, then the developer may rush to distribute a patch without the same care that is used under normal circumstances. When patches are distributed to the administrators of the computer systems, they are responsible for scheduling and installing the patches to remove the vulnerabilities.

Unfortunately, administrators often delay the installation of patches to remove vulnerabilities for various reasons. When a patch is installed, the software system and possibly the computer system on which it is executing may need to be shut down and restarted. If the vulnerability is in a software system that is critical to the success of an enterprise, then the administrator needs to analyze the tradeoffs of keeping the software system up and running with its associated risk of being attacked and of shutting down a critical resource of the enterprise to install the patch. Some administrators may delay the installation of the patch because they fear that, because of a hasty distribution, it might not be properly tested and have unintended side effects. If the patch has an unintended side effect, then the software system, the computer system, or some other software component that is impacted by the patch may be shut down by the patch itself. Administrators need to factor in the possibility of an unintended side effect when deciding whether to install a patch. These administrators may delay installing a patch until experience by others indicates that there are no serious unintended side effects.

Intrusion detection systems have been developed that can be used to identify whether an attempt is being made to exploit a known vulnerability that has not yet been patched. These intrusion detection systems can be used to prevent exploitations of newly discovered vulnerabilities for which patches have not yet been developed or installed. These intrusion detection systems may define a "signature" for each way a vulnerability can be exploited. For example, if a vulnerability can be exploited by sending a certain type of message with a certain attribute, then the signature for that exploitation would specify that type and attribute. When a security enforcement event occurs, such as the receipt of a message, the intrusion detection system checks its signatures to determine whether any match the security enforcement event. If so, the intrusion detection system may take action to prevent the exploitation, such as dropping the message.

A set of one or more signatures may be considered a security policy. Developers of intrusion detection systems may provide various security policies. For example, a developer may provide one security policy that defines signatures of vulnerabilities of an operating system and many other security policies that are specific to an application or a class of applications. Similarly, an administrator may define a security policy that is specific to custom applications used by the enterprise.

Unfortunately, security policies may have restrictions that adversely impact programs (e.g., application programs and operating system components) running on a computer system. For example, a security policy may conflict with access requirements of a program to a resource. For instance, a program may require access to a certain server, but the security policy may prevent access to the server. If the program cannot access the resource, then the program may appear to have a problem. It can be a difficult and time-consuming process requiring a high degree of skill to debug the program, the security policy, or both in order to fix the problem. When a problem with a program occurs, a system administrator may simply disable the security policy, rather than spend the resources needed to debug and fix the problem.

The disabling of a security policy may have very adverse consequences for many programs including the program with the problem. The disabling of the security policy may open all the programs to exploitation of their vulnerabilities. It would be desirable to have a mechanism that would allow for only limited disabling of a security policy in a way that would not open all programs to exploitation of vulnerabilities covered by the security policy.

SUMMARY

A method and system for selectively excluding one or more programs from a security policy is provided. The security system receives from a user an indication of a program with a problem that is to be excluded from the security policy. When the program executes and a security enforcement event occurs, the security system does not apply the security policy. If the problem appears to be resolved as a result of excluding the program from the security policy, then the user may assume that the security policy is the cause of the problem.

DETAILED DESCRIPTION

Figure 1:
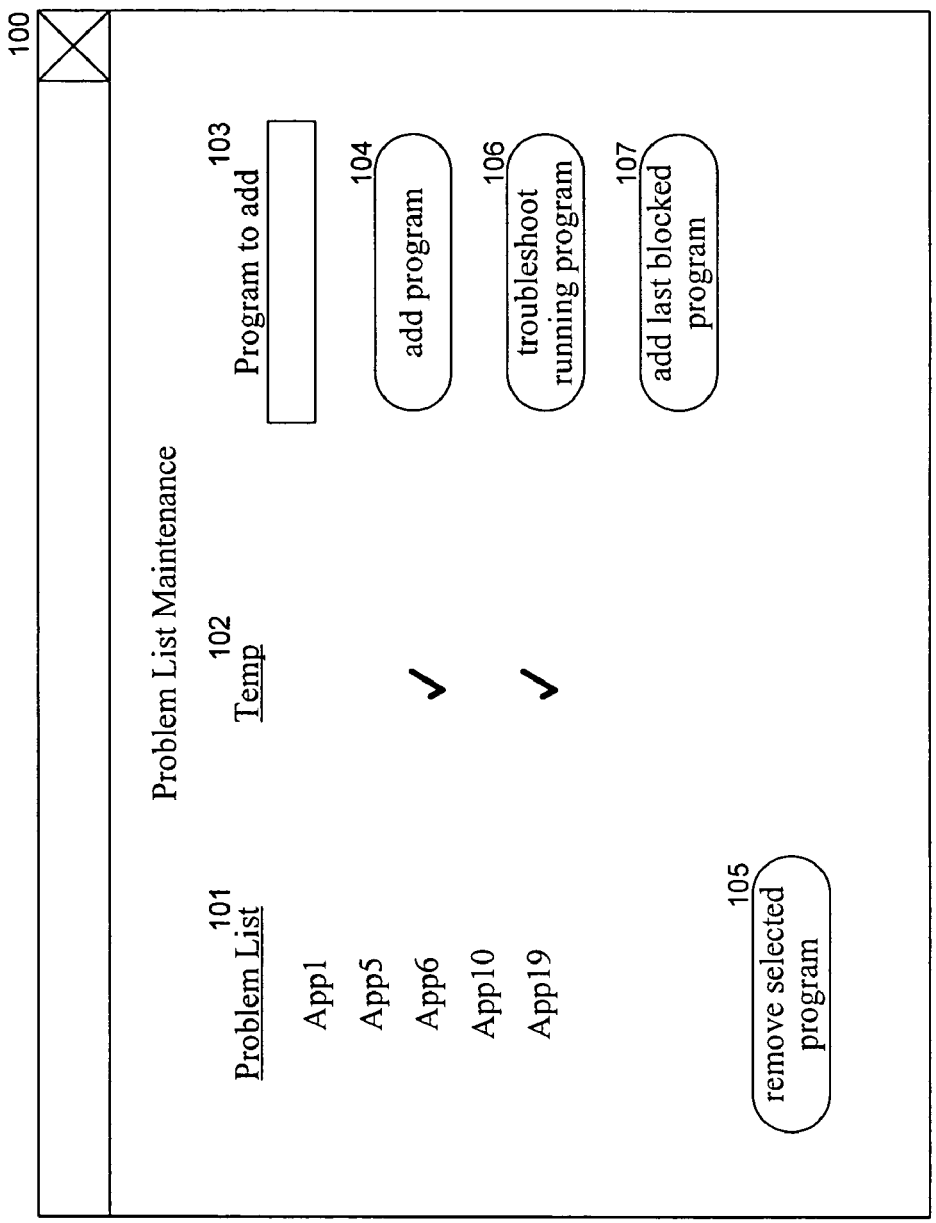
FIG. 1 is a diagram illustrating a display page of the security system in one embodiment.

A method and system for selectively excluding a program from a security policy is provided. In one embodiment, the security system receives an indication of a program that is to be excluded from the security policy. For example, when a user notices that a program has a problem, the user (e.g., system administrator) may suspect that the program has a conflict with the security policy. The user may want to troubleshoot the problem to determine whether the security policy is a cause of the problem. Troubleshooting refers to the process of identifying whether there is a conflict between a security policy and a program and excluding the program from the security policy (or portion of the security policy) that is causing the conflict. To troubleshoot the problem, the user indicates that the program with the problem is to be excluded from the security policy. When the program executes and a security enforcement event occurs, the security system does not apply the security policy. If the problem appears to be resolved as a result of excluding the program from the security policy, then the user may assume that a conflict with the security policy is the cause of the problem. If the problem is not resolved, then the user may assume that a conflict with the security policy is not the problem. Furthermore, the user is able to use the program, albeit without the security policy being applied, while having the security policy applied to other programs. In this way, the security system allows programs to be excluded from a security policy on a program-by-program basis when there appears to be a conflict between the security policy and the program.

In one embodiment, the security system applies a relaxed security policy, rather than no security policy, to programs designated by users. The security system maintains a list of programs that are to have a relaxed security policy applied. Since the programs in the list are typically programs that appear to a user to have a problem, the list is referred to as a "problem list." One skilled in the art will appreciate that programs can be included on the problem list even though the programs do not appear to have a problem. When a security enforcement event occurs for a program, the security system may apply the non-relaxed security policy. If the non-relaxed security policy indicates to block the security enforcement event, the security system then determines whether the program is on the problem list. If the program is on the problem list, then the security system applies the relaxed security policy and allows or blocks the security enforcement event accordingly. Alternatively, when a security enforcement event occurs for a program, the security system may initially determine whether the program is on the problem list. If so, the security system may immediately apply the relaxed security policy to that security enforcement event without first applying the non-relaxed security policy.

In one embodiment, the security system may allow a user to temporarily add one or more programs to the problem list. After a certain criteria occurs (e.g., expiration of a time period, reboot of the computer system, or a certain number of executions of the program), the security system removes those temporarily added programs from the problem list. A user may temporarily add a program with a problem to the problem list so that the user can determine whether the security policy is the cause of the problem without having to worry about removing the program from the problem list at a later time. If it turns out that a conflict with the security policy was the cause of the problem, then the security system allows the user to indicate that the program should be included in the problem list on a non-temporary basis. In one embodiment, the security system may allow a user to temporarily add a group of programs to the problem list. For example, when the user notices that a running program has a problem, the user may request the security system to temporarily add all running programs to the problem list. If the problem then appears to be resolved, the user can then indicate to the security system that one or more of the programs should be included in the problem list on a non-temporary basis. The security system may also progressively add running programs to the problem list when the troubleshoot program button is selected. For example, when a user first selects the button, the security system may add running programs developed by unknown sources. If the problem persists, then when the user again selects the button, the security system may add programs from known sources (e.g., Microsoft). Alternatively, the security system can progressively add programs based on resources accessed.

In one embodiment, the security system may progressively relax the security policy for some or all of the programs until the problem with a program is resolved. For example, if the security policy indicates that a program is only allowed 5 TCP connections and a program needs more, the program's request for the $6^{th}$ TCP connection will be blocked. The user may then request the security system to relax the TCP connection requirement (e.g., expressed as a rule of the security policy). The security system may first relax the requirement to allow 8 TCP connections. If there still appears to be a problem with the program, the user may request the security system to further relax the requirement. The security system may relax the requirement to allow 12 TCP connections. The user may repeat this process until the problem has been resolved. If the problem can not be resolved by relaxing the security policy, then the user may request the security system to exclude the program permanently from the security policy. If another program on the problem list is executed, then it will not be allowed more than 12 TCP connections unless the user requests further relaxation of the requirement. In one embodiment, the security system may progressively relax the security policy for each program independently of the relaxing of the security policy of other programs. In this way, each program can have a custom security policy. Alternatively, the security system may apply a relaxed security policy to all programs and might not use a problem list. The security system may allow an administrator to view and modify the relaxed security policy.

In one embodiment, a security policy includes rules that specify conditions, actions, and optionally exceptions. For example, a rule may indicate that an application may not receive messages on any network port other than port 80. The condition of the rule may be satisfied when a message is received on a network port other than port 80, and the action may result in the message being discarded. As another example, a rule may indicate that when an application attempts to send a message on network port 80, authorization is to be solicited from a user of the computing system on which the rule is enforced. The rules may be categorized into rule or security types based on their behavior. For example, rules with a network security type may be directed to security enforcement for network traffic. Each security type may have its own security component for enforcing rules of that security type. Languages for specifying security policies are described in U.S. patent application Ser. No. 10/882,438, entitled "Languages for Expressing Security Policies" and filed on Jul. 1, 2004, which is hereby incorporated by reference.

The condition, action, and exception of the rules may be specified as expressions. A rule may be semantically expressed as "IF conditions THEN actions EXCEPT exceptions." Conditions of a rule are expressions of circumstances under which security enforcement actions of the rule are to be performed. An action is an expression of activity to be performed when the condition is satisfied. A rule may have multiple actions. An exception is an expression of when the actions may not be performed even though the condition is satisfied. A condition may be either static or dynamic. A static condition is one which refers, for example, to a hard-coded list of files. A dynamic condition is one which, for example, performs a query to determine a list of files matching a provided criterion. Security enforcement actions may include allowing a request that caused the security enforcement event, denying the request, soliciting input from a user, notifying the user, and so on. Other rule constructs are also possible. As an example, an "else" construct could be added to perform alternate actions when a condition is false.

FIG. 1 is a diagram illustrating a display page of the security system in one embodiment. The display page 100 allows a user to maintain the problem list 101 by adding and removing programs. The problem list in this example includes "App1," "App5," "App6," "App10," and "App19." The temporary field 102 indicates whether the corresponding program has been added to the problem list temporarily. In this example, "App6" and "App19" and have been added temporarily as indicated by the check marks. A user may add a program to the problem list by entering its name in a text box 103 and then selecting the add program button 104. One skilled in the art will appreciate that the security system may display a list of currently running programs (e.g., applications, operating system components, and processes) and allow the user to select the programs to add to the problem list. To remove a program from the problem list, a user selects the program from the problem list and then selects the remove selected program button 105. The security system may allow a user to troubleshoot running programs by temporarily adding all running programs to the problem list by selecting the troubleshoot running program button 106. In addition, the security system may allow a user to add the last program that was blocked to the problem list by selecting the add last blocked program button 107. The security system may also allow the user to toggle the temporary field for a program. The security system may allow programs to be added to the list for a user-specified duration and may let the user specify an action such as "logging" or "notify" that should be taken prior to application of a relaxed security policy. Thus, programs that have a block for some security event will have the relaxed policy applied after the user-specified action has been taken. The user-specified action can be to log data about the security event or to notify the user. The log entries or notifications can be used by the user to understand the effects of the security policy in order to evaluate whether to remove programs from or add programs to (e.g., permanently) the problem list. The user may also evaluate whether to keep a program in the list permanently by first putting all running programs in the list and then taking the programs out of the list one by one to determine which program(s), when taken out of the list, causes a problem.

Figure 2:
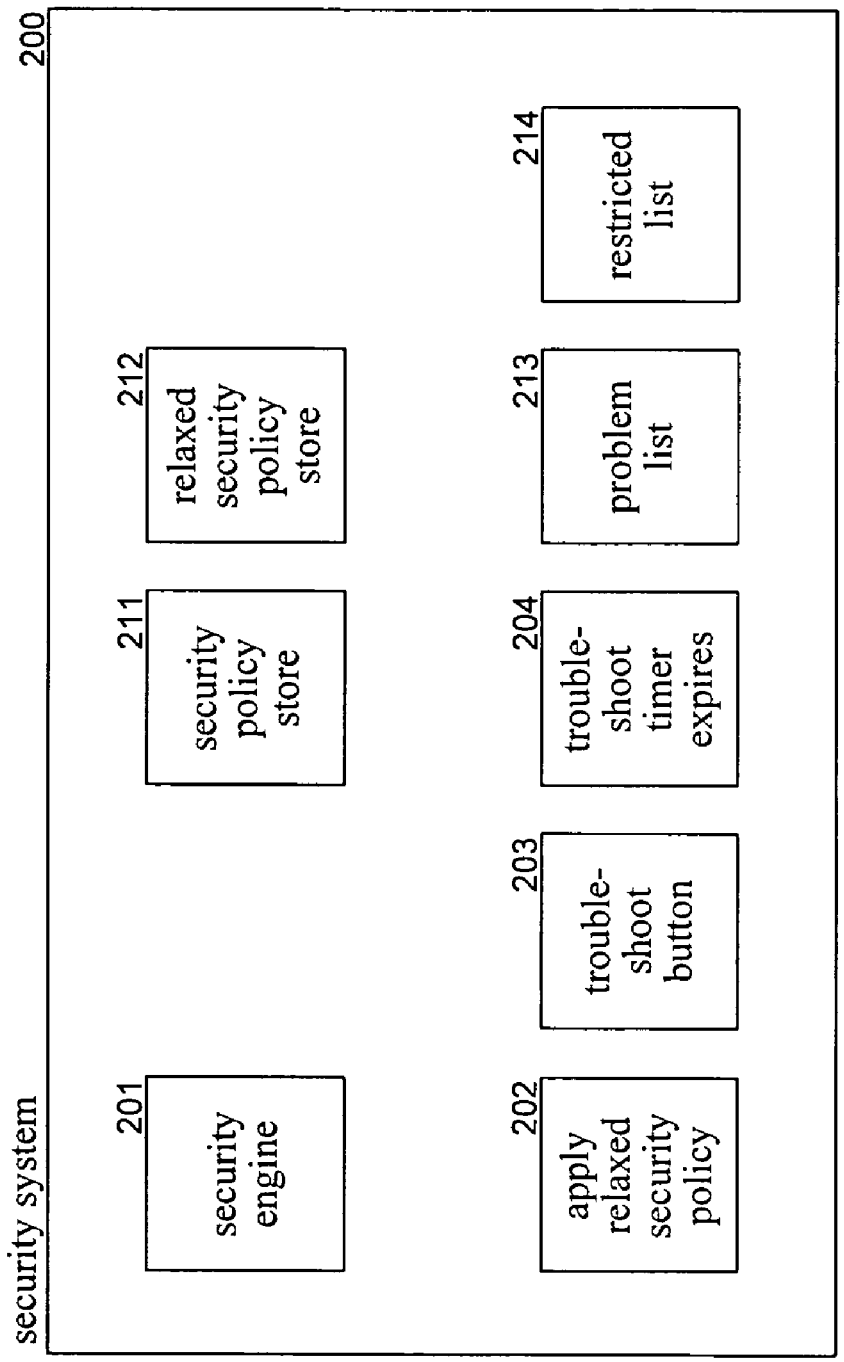
FIG. 2 is a block diagram that illustrates components of the security system in one embodiment.

FIG. 2 is a block diagram that illustrates components of the security system in one embodiment. The security system 200 includes a security engine 201, an apply relaxed security policy component 202, a troubleshoot button component 203, and a troubleshoot timer expires component 204. The security system also includes a security policy store 211, a relaxed security policy store 212, a problem list 213, and a restricted list 214. The security engine receives the security enforcement events of a program and applies the security policy or the relaxed security policy based on whether the program is in the problem list. The security engine may invoke the apply relaxed security policy component when an event is blocked so that the program can have a relaxed security policy applied. The security policy store and the relaxed security policy store contain the "non-relaxed" security policy and the "relaxed" security policy, respectively. The troubleshoot program button component is invoked when a user selects the troubleshoot program button. The troubleshoot program button component temporarily adds all running programs to the problem list and starts a troubleshoot timer. When the timer expires, the troubleshoot timer expires component is invoked to remove from the problem list the programs that are designated as temporary. The problem list contains a list of all the programs along with their temporary status that are to have a relaxed security policy applied. The restricted list contains the programs that cannot be excluded from the security policy. For example, a system administrator may not want a user to exclude programs recently downloaded to the computer system to have a relaxed security policy applied (e.g., in case the downloaded program is infected with a virus). In one embodiment, the security system may not allow programs in the restricted list to be added to the problem list.

The computing device on which the security system is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

The security system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
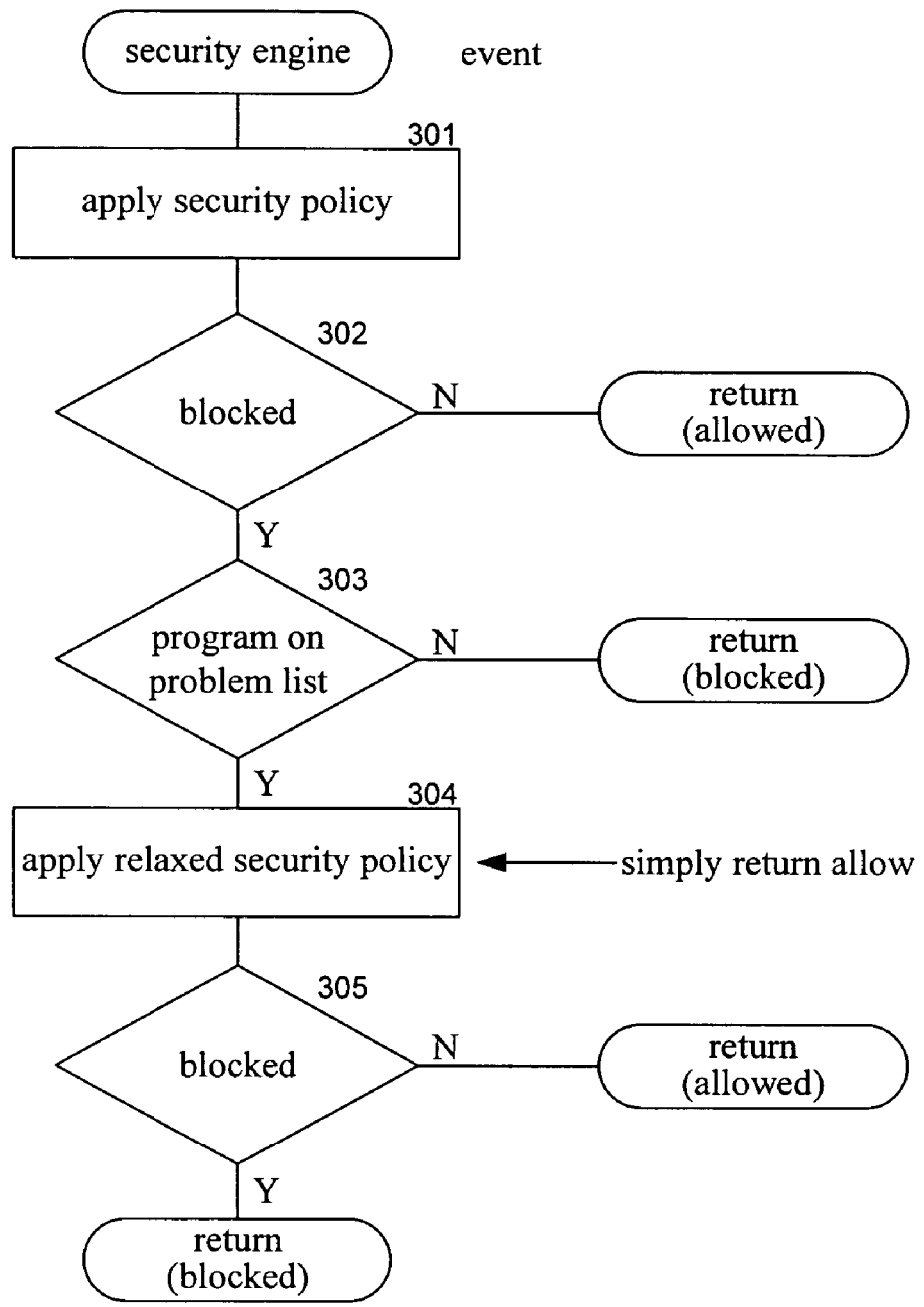
FIG. 3 is a flow diagram that illustrates the processing of the security engine in one embodiment.

FIG. 3 is a flow diagram that illustrates the processing of the security engine in one embodiment. The security engine is passed a security enforcement event for a program. The security engine in this embodiment applies the non-relaxed security policy to the event. If the event is blocked, then the component determines whether the program is on the problem list. If so, the security engine applies a relaxed security policy that allows or blocks the event. In block 301, the security engine applies the non-relaxed security policy. In decision block 302, if the event is blocked, then the security engine continues at block 303, else the security engine returns an indication that the event is allowed. In decision block 303, if the program is on the problem list, then the security engine continues at block 304, else the security engine returns an indication that the event is blocked. In block 304, the security engine applies a relaxed security policy to the passed event. In decision block 305, if the relaxed security policy indicates that the event is blocked, then the security engine returns an indication that the event is blocked, else the security engine returns an indication that the event is allowed.

Figure 4:
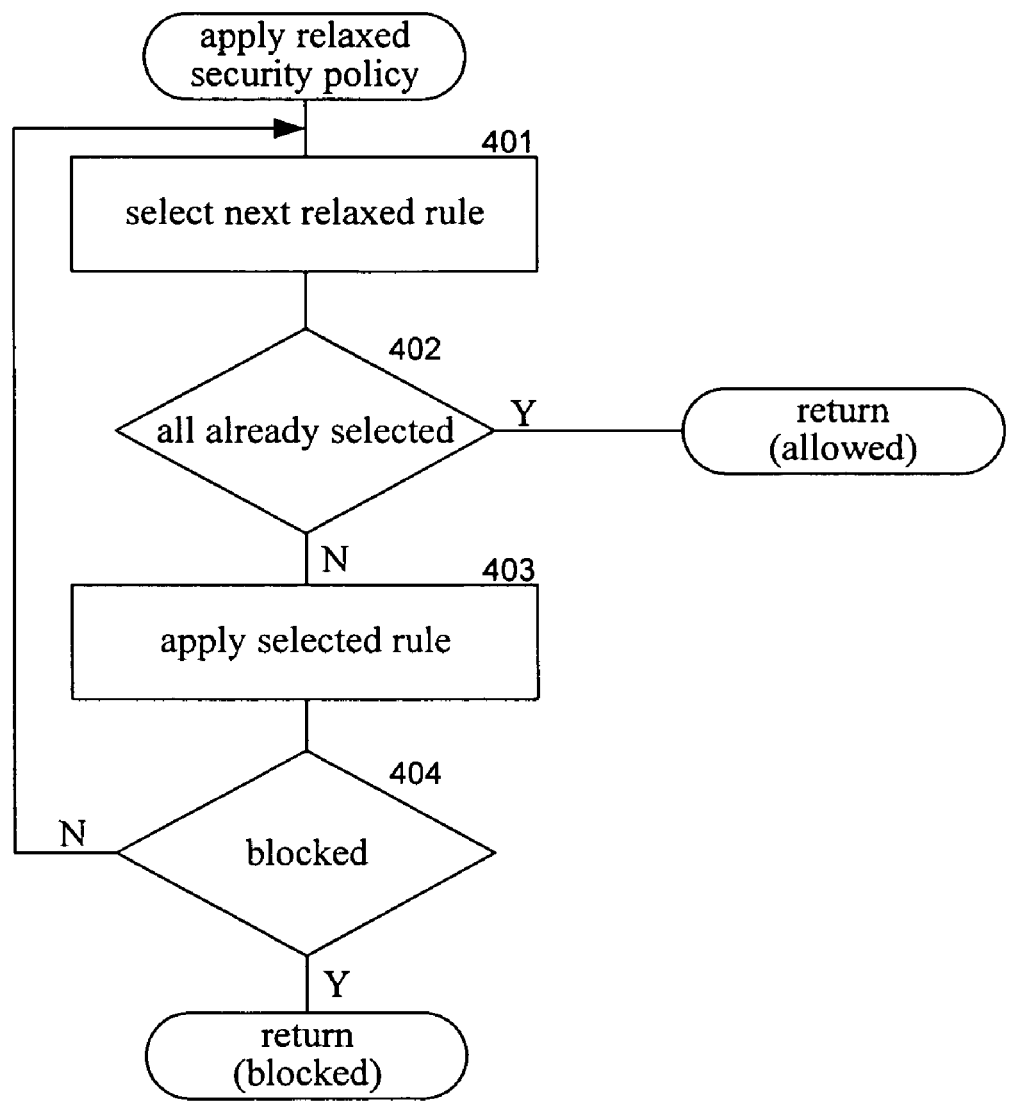
FIG. 4 is a flow diagram that illustrates the processing of the apply relaxed security policy component in one embodiment.

FIG. 4 is a flow diagram that illustrates the processing of the apply relaxed security policy component in one embodiment. The component is passed an event and applies the rules of the relaxed security policy to the event. In block 401, the component selects the next rule of the relaxed security policy. In decision block 402, if all the rules of the relaxed security policy have already been selected, then the component returns an indication that the event is allowed, else the component continues at block 403. In block 403, the component applies the selected rule to the passed event. In decision block 404, if the applied rule indicates to block the event, then the component returns an indication that the event is blocked, else the component loops to block 401 to select the next rule of the relaxed security policy.

Figure 5:
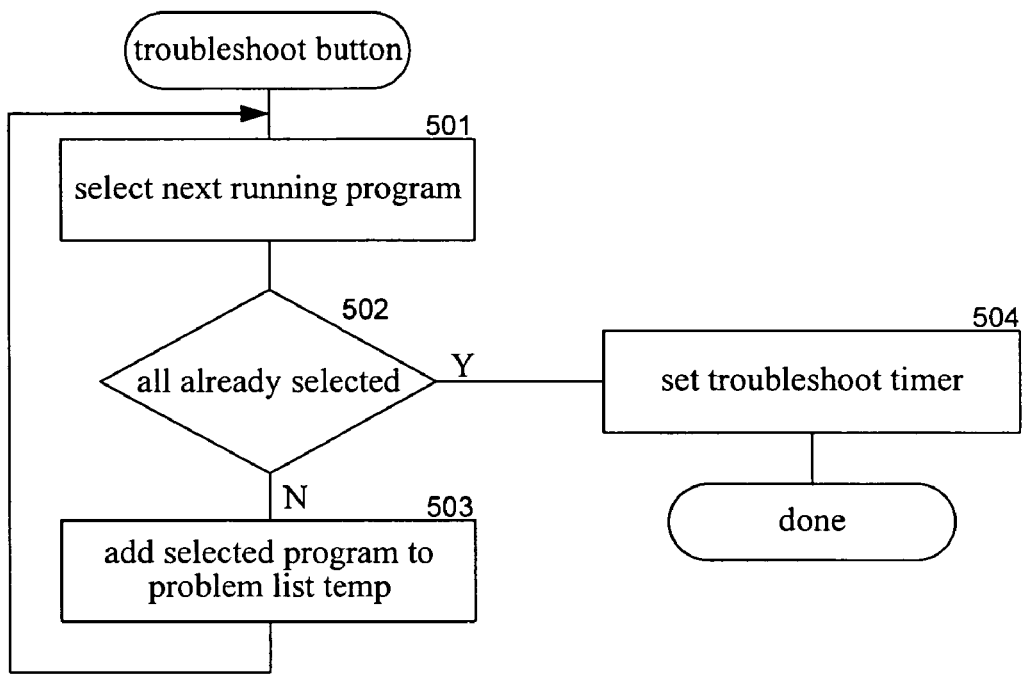
FIG. 5 is a flow diagram that illustrates the processing of the troubleshoot button component in one embodiment.

FIG. 5 is a flow diagram that illustrates the processing of the troubleshoot button component in one embodiment. The component is invoked when a user selects the troubleshoot program button. In block 501, the component selects the next running program. In decision block 502, if all the running programs have already been selected, then the component continues at block 504, else the component continues at block 503. In block 503, the component temporarily adds the selected program to the problem list and then loops to block 501 to select the next running program. In block 504, after all the running programs have been added to the problem list, the component sets a troubleshoot timer and then completes. The component may also add only certain subsets of the running programs to the problem list. For example, the component might add application programs to the problem list, but not operating systems components.

Figure 6:
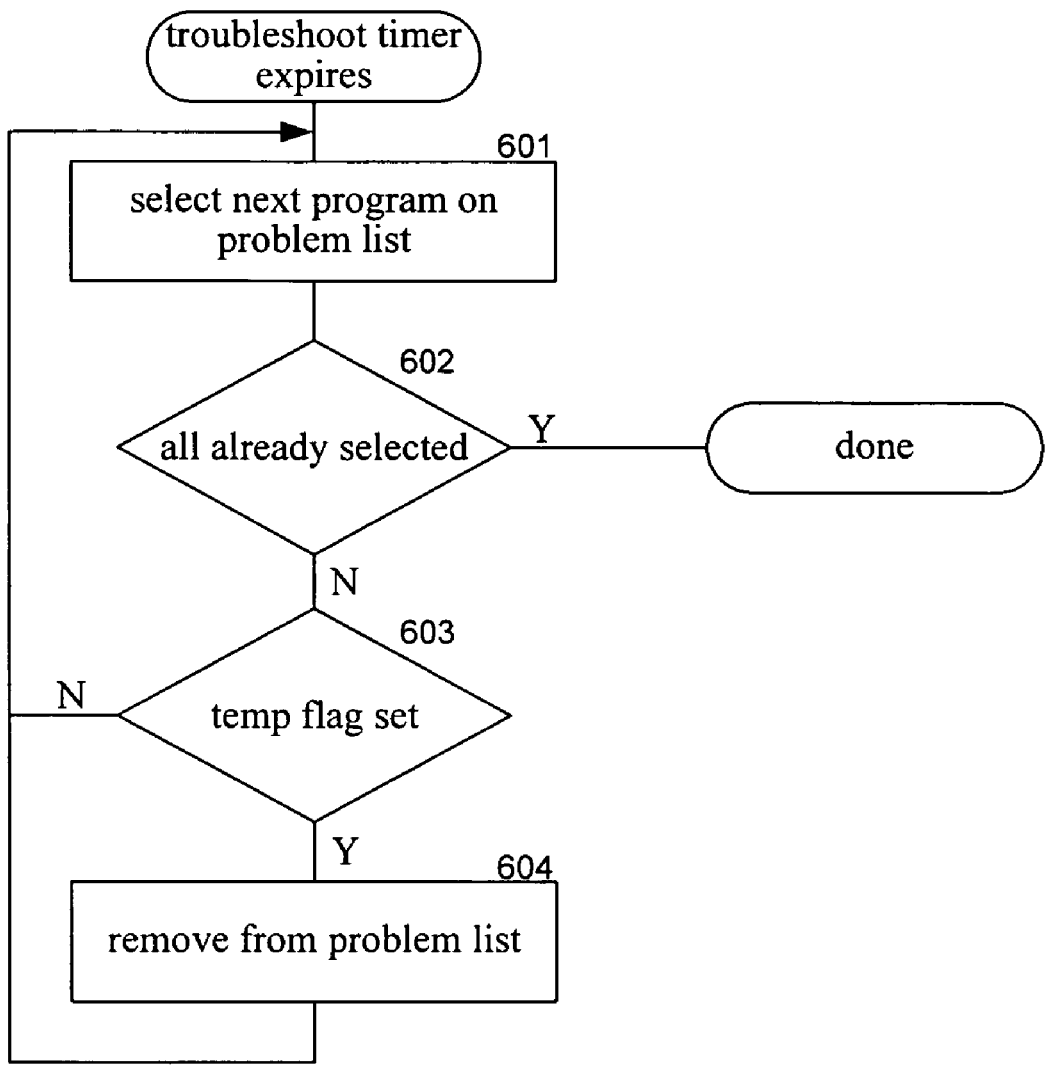
FIG. 6 is a flow diagram that illustrates the processing of the troubleshoot timer expires component in one embodiment.

FIG. 6 is a flow diagram that illustrates the processing of the troubleshoot timer expires component in one embodiment. This component is invoked when the troubleshoot timer expires, and it removes programs from the problem list that were temporarily added. In block 601, the component selects the next program in the problem list. In decision block 602, if all the programs of the problem list have already been selected, then the component completes, else the component continues at block 603. In decision block 603, if the temporary flag is set for the selected program, then the component continues at block 604, else the component loops to block 601 to select the next program on the problem list. In block 604, the component removes the selected program from the problem list and then loops to block 601 to select the next program in the problem list.

From the foregoing, it will be appreciated that specific embodiments of the security system have been described herein for purposes of illustration, but that various modifications may be made without deviating from the spirit and scope of the invention. For example, if the security system is running on a computer system that is shared by multiple users (e.g., at a kiosk), the security system may clear the problem list whenever the computer system is rebooted. In one embodiment, each rule of a security policy may have a specification of how to relax the rule. The specification may be a relaxed rule or a function or script that indicates how to relax the rule. Whenever a rule indicates to block a security enforcement event, the security system may then apply the relaxed version of the rule to determine whether to block or allow the event. In one embodiment, the security system may allow a user to specify a class of programs to be added to the problem list. For example, the user may specify that all programs that use a certain resource (e.g., port 80) are to be added to the problem list. Also, the security system may allow a user to specify which components of a program are to be added to the problem list. Accordingly, the invention is not limited except as by the appended claims.

The invention claimed is:

1. A method in a computer system for troubleshooting a security policy by selectively excluding a program from the security policy, the method comprising:
providing a security policy that includes rules indicating that when security events occur for programs whether to block or allow the security events;
providing a relaxed security policy that includes rules indicating that when security events occur for programs whether to block or allow the security events, the relaxed security policy allowing at least one security event that would be blocked by the security policy;
providing a problem list of programs to be excluded from the security policy by
receiving from a user a request to temporarily add all programs currently running on the computer system to the problem list of programs;
in response to receiving the request,
identifying programs that are currently running on the computer system; and
adding on a temporary basis the identified programs to the problem list of programs;
when a security event for a program occurs,
applying the security policy to the security event;
when the applied security policy indicates to allow the security event, allowing the security event; and
when the applied security policy indicates to block the security event,
when the program is not in the provided problem list of programs, blocking the security event; and
when the program is in the provided problem list of programs, applying the relaxed security policy to the security event to indicate whether to block or allow the security event such that at least one security event that is blocked by the security policy is allowed by the relaxed security policy;
receiving from a user an indication that the troubleshooting indicates that a program in the problem list of programs has a conflict with the security policy; and
switching the indicated program from being in the problem list of programs on a temporary basis to a non-temporary basis; and
automatically removing the added programs from the problem list of programs when a certain criterion occurs except for any program that has been switched to being in the problem list of programs on a non-temporary basis.

2. The method of claim 1 including after a time period, automatically removing the temporarily added programs from the problem list of programs.

3. The method of claim 1 including removing one or more of the temporarily added programs from the problem list of programs to determine whether the problem is resolved with those one or more programs removed.

4. The method of claim 1 wherein the relaxed security policy indicates to allow all security events.

5. The method of claim 1 including performing a user-specified action before the relaxed security policy is applied.

6. A computer-readable storage medium containing instructions for controlling a computer system to troubleshoot a first security policy by relaxing the first security policy for a designated program, by a method comprising:
   applying rules of the first security policy to security events for a plurality of programs on the computer system such that at least one security event is blocked;
   when a problem with a program occurs as a result of an occurrence of a security event,
      receiving from a user a request to temporarily add all programs currently running on the computer system to a list of programs;
   in response to receiving the request,
      identifying programs that are currently running on the computer system; and
      adding the identified programs to the list of programs; and
   relaxing the first security policy to form, for each of the identified programs, a second security policy in which at least one security event that is blocked when the first security policy is applied is allowed when the second security policy of the identified program is applied;
   when a security event for a program in the list of programs occurs,
      applying the second security policy of that program to the security event so that a security event that would be blocked under the first security policy is allowed under the second security policy of that program; and
   when the security event is blocked by applying the second security policy of that program, progressively relaxing the second security policy of that program until the security event is allowed under the progressively relaxed second security policy of that program to effect the troubleshooting of the first security policy, wherein each program in the list of programs has a second security policy that is relaxed independently of the second security policies of the other programs in the list of programs; and
   when the certain criterion of a program in the list of programs occurs, automatically removing the program from the list of programs so that the second security policy is no longer applied to security events of the program.

7. The computer-readable storage medium of claim 6 wherein a problem occurs when the applying of the first security policy indicates to block a security event for a program.

8. The computer-readable storage medium of claim 6 wherein the second security policy is applied to programs in the list of programs and a first security policy is applied to other programs.

* * * * *